United States Patent
Latarnik et al.

(10) Patent No.: US 6,822,561 B2
(45) Date of Patent: Nov. 23, 2004

(54) METHOD AND DEVICE FOR DETECTING A DROP IN PRESSURE IN MOTOR VEHICLE TIRES

(75) Inventors: Michael Latarnik, deceased, late of Friedrichsdorf (DE); by Christine Latarnik, legal representative, Friedrichsdorf (DE); by Sylvia Monika Latarnik, legal representative, Friedrichsdorf (DE); by Eva-Maria Latarnik, legal representative, Friedrichsdorf (DE); Martin Griesser, Eschborn (DE); Andreas Köbe, Bensheim (DE); Frank Edling, Frankfurt (DE)

(73) Assignee: Continental Aktiengesellschaft, Hannover (DE)

(*) Notice: Subject to any disclaimer, the term of this patent is extended or adjusted under 35 U.S.C. 154(b) by 0 days.

(21) Appl. No.: 10/149,774

(22) PCT Filed: Dec. 15, 2000

(86) PCT No.: PCT/EP00/12828

§ 371 (c)(1),
(2), (4) Date: Sep. 3, 2002

(87) PCT Pub. No.: WO01/44001

PCT Pub. Date: Jun. 21, 2001

(65) Prior Publication Data

US 2003/0052774 A1 Mar. 20, 2003

(30) Foreign Application Priority Data

Dec. 15, 1999 (DE) .......... 199 60 419
Aug. 22, 2000 (DE) .......... 100 41 248
Oct. 11, 2000 (DE) .......... 100 50 197

(51) Int. Cl.$^7$ .......... B60C 23/00
(52) U.S. Cl. .......... 340/442; 340/444; 340/461; 340/443
(58) Field of Search .......... 340/442, 444, 340/443, 825.36, 461, 462, 447; 73/146.5, 146.2

(56) References Cited

U.S. PATENT DOCUMENTS

| | | | | |
|---|---|---|---|---|
| 5,000,241 A | * | 3/1991 | Patecell | 152/382 |
| 5,239,469 A | * | 8/1993 | Walker et al. | 701/29 |
| 5,591,906 A | * | 1/1997 | Okawa et al. | 73/146.5 |

* cited by examiner

*Primary Examiner*—Jeffery Hofsass
*Assistant Examiner*—Eric Blount
(74) *Attorney, Agent, or Firm*—Walter Ottesen (57) ABSTRACT

The invention relates to a method for detecting a drop in pressure of a motor vehicle tire by evaluating wheel speeds determined by sensors. The method for detecting the drop in pressure is based on the detection of a large drop in pressure or a complete drop in pressure using a reduction of the angular velocity or an increase (8) in the dynamic read radius $r_d$ of one or more wheels. The invention also relates to a device for controlling the braking power and/or driving dynamics and for measuring the pressure of vehicle tires wherein a microcomputer, which is connected to wheel rotational speed sensors and optionally to driving dynamic sensors, is used to perform the aforementioned method and a known method for regulating the braking power and/or driving dynamics.

18 Claims, 5 Drawing Sheets

METHOD AND DEVICE FOR DETECTING A DROP IN PRESSURE IN MOTOR VEHICLE TIRES

BACKGROUND OF THE INVENTION

Motor vehicles, which are equipped with an electronic system for controlling the driving dynamic, such as ABS, ASR or ESP, usually have a unit for measuring the angular velocity of the vehicle wheels. A measurement of the angular velocity of the vehicle wheels can especially take place with the aid of active wheel rpm sensors. It is already known that the monitoring of a change in the angular velocity of the wheels is suitable for tire pressure loss detection.

The known systems for detecting a pressure loss practically always proceed from the situation that an increase of the wheel rpm or a drop of the dynamic wheel radius results when there is a lowering pressure.

To detect the wheel rpm information, some systems store the actual wheel velocity first in a memory and evaluate this actual wheel velocity at a later time point. Compared to systems which undertake no storage of data, a conclusion can be drawn as to the actual driving situation from the trace of the wheel velocities so that fluctuations of the wheel angular velocities can be removed from the data which is necessary for an adequate accuracy of the pressure loss detection. The fluctuations of the wheel angular velocities are superposed on the tire pressure loss.

It is common for practically all known tire pressure detection systems that the detection system must first be advised when the desired rated pressure $P_0$ of the mounted wheels is adjusted. This starting condition for the tire pressure detection can be told to the electronic system, for example, by means of a reset switch which must be pressed by the operator of the vehicle. If, after a specific time, a pressure loss occurs at one or more wheels, the tire pressure of the affected wheel drops by the pressure difference AP. As a consequence of the pressure loss, the dynamic rolling radius of the affected wheel changes in a characteristic manner dependent upon the tire. As mentioned above, in known pressure loss detection systems, a pressure loss is detected when the dynamic rolling radius of the affected wheel is reduced by a specific minimum value whereby the wheel rpm increases.

Numerous methods for detecting a pressure loss have been suggested by evaluating the wheel velocity. Known methods for detecting pressure loss on the basis of wheel rpm information often are concerned with carrying out the pressure loss detection with still greater reliability and accuracy. The difficulty of carrying out a pressure loss detection with high accuracy is to distinguish a change of the dynamic rolling radius based on a pressure loss from changes of the dynamic rolling radius which can be caused, inter alia, by dynamic driving situations, especially driving in a curve, acceleration, deceleration, et cetera and roadway defects (potholes, various friction values) and are, as a rule, greater than the influence of a pressure loss on the dynamic rolling radius (disturbance effects).

For a pressure loss detection with high detection accuracy even during dynamic driving maneuvers, a method has been suggested in German patent application 199 61 681. Here, additional physical data, such as yaw rate, acceleration, brake actuation, engine torque, et cetera are included in the detection algorithm for pressure loss detection so that a pressure loss detection can be carried out even during dynamic driving maneuvers (driving in a curve, acceleration, braking, et cetera).

In U.S. Pat. No. 6,439,045, a pressure loss detection method is described, which is integrated into an electronic anti-blocking system CABS), wherein, after triggering the reset switch, when the rated pressure of the wheels is adjusted, first a time limited learning phase is run through in which a microcontroller follows wheel angular velocities while considering the driving situation and from the time-dependent trace of the reference values, upper and lower limit values ($G_1$ and $G_2$) are fixed. The reference values are formed from the wheel angular velocities. After the learning phase, a comparison phase starts in which a check is made as to whether the actual specific reference values lie within the range defined by the learned limit values.

The method considers the actual driving situation by excluding, during the learning phase and during the comparison phase, reference values during unsuitable dynamic driving situations.

Known methods detect a pressure loss in the tire based on an increase of the angular velocity or a drop of the dynamic rolling radius for one or more wheels. The quality of the detection is, however, often not reliable enough because the criterion for detecting is based on a comparatively small change of the wheel rpm and the wheel rpm is influenced by a plurality of unwanted effects to a larger extent than the effect to be measured.

SUMMARY OF THE INVENTION

The task of the invention is to provide a method for detecting a pressure loss on the basis of the wheel rpm signals which is less sensitive relative to unwanted effects than known methods. Such unwanted effects are, for example, changes of the wheel rpm because of travel in a curve.

The present invention is based on the principle of detection of a pressure loss based on a drop of the angular velocity or an increase of the dynamic rolling radius for one or more wheels.

The pressure measurement takes place in a manner known per se by evaluating angular velocities of all wheels of the vehicle or evaluating informations which indicate the angular velocities on the basis of time intervals. The angular velocities are determined by sensor means.

In the detection method of the invention, the surprising effect is utilized that, when a tire has lost so much pressure that the tire rolls essentially on the emergency tread, this tire indicates an increase of the dynamic rolling radius, that is, a detectable drop of the wheel velocity.

Preferably, the wheel has an emergency tread arranged within the tire casing, especially, the wheel is a run-flat wheel having an emergency tread arranged on the rim.

According to the invention, the detection of the increase of the dynamic rolling radius of a wheel can preferably take place in that:

M1: a check is made as to whether a fixed pregiven or learned desired value is exceeded by the measured dynamic rolling radius; or, M2: a check is made as to whether the dynamic rolling radius increases after it has previously dropped.

The method M2, which is especially preferred, can also be a method combined with the methods Prog A and Prog B described below. For example, an initially weak drop of the dynamic rolling radius as a consequence of a pressure loss before the tire casing seats on the emergency body (time point of the start of the flat) can be determined first with the methods Prog A and Prog B. If, thereafter, the dynamic rolling radius increases sharply, then a flat is present.

In a further preferred embodiment and according to the method of the invention, a tire pressure loss is exclusively detected in that a check is made whether the angular velocity or the dynamic rolling radius of the observed wheel increases by more than a pregiven threshold value.

According to the invention, suitable wheels for the vehicle are, for example, conventional tires having standard rims or preferably tires having emergency running characteristics, especially run-flat wheels having an emergency tread or run-flat tires having side walls reinforced for emergency running. Especially preferred are run-flat wheels having an emergency tread which is mounted on the rim. To generate a velocity pattern, the emergency tread can be modified in a run-flat wheel or run-flat tire in such a manner that during the rotation of the tire in a flat tire run during travel, a defined velocity pattern is generated.

A run-flat wheel which is preferably usable according to the method of the present invention is described in U.S. Pat. No. 6,591,668 which is incorporated herein by reference. In the type of tire described, the emergency tread then comes into contact with the inner side of the tire when the tire pressure is no longer adequate to carry the load operating on the tire.

The present invention relates in a preferred embodiment also to a method for detecting a pressure loss of tires in a motor vehicle during travel which is suitable for determining a comparatively slight drop of the tire pressure below a definable threshold value (critical tire pressure) which is carried out parallel or quasi parallel to the method described above. This further method is based on a detection known per se of a pressure loss on the basis of an increase of wheel velocity.

Preferably, additional submethods are provided which respectively define a separate operational method for measuring the pressure in a vehicle tire or for detecting a critical tire pressure.

The steps of the submethod or further submethods are carried out in parallel or quasi parallel in accordance with the invention. The parallel operating submethods can be computer programs processed by a microcomputer. If, for example, the submethods are subprograms, then these subprograms can be so incorporated into a main loop of an operating program that they are called up sequentially during processing of the main loop. It is also possible that the work time of a microcomputer, which is made available to the submethods, is subdivided between the individual program parts or in accordance with a time scheme "interrupt controlled". A quasi parallel processing is understood to be when one of the above described procedures according to the invention is present.

All submethods are preferably so configured that they output a signal, for example, via a line or even via a data register, after detection of a pressure loss which contains the information "pressure loss". It is understood that also additional signals, which contain information for identifying the submethod, can be transmitted via this line or via a further data register.

In a preferred embodiment of the invention, a first further and a second further submethod are carried out in parallel or quasi parallel.

The submethods generate one or more reference quantities preferably from the angular velocities or from information which indicates the angular velocities on the basis of time intervals. The values of the reference quantities are preferably checked as to whether upper and lower limit values $G_1$, $G_2$ are exceeded. The second submethod especially has limit values $^BG_1$, $^BG_2$ which define a narrower range than the limit values $^AG_1$, $^AG_2$ of the first submethod so that $^BG_1 < ^AG_1$ and $^BG_2 > ^AG_2$.

Preferably, the threshold values $^AG_1$ and $^AG_2$ in the first further submethod are so selected that a warning is outputted as to a pressure loss for a residual pressure of approximately 1.0 to 1.4 bar. The threshold values $^BG_1$ and $^BG_2$ in the second further submethod are preferably so selected that a warning takes place in response to a pressure loss already at a residual pressure of approximately 1.5 to 2.0 bar.

The first further submethod responds preferably only for a comparatively large pressure loss. This submethod is therefore provided for driving maneuvers which exhibit a high dynamic. The term "dynamic driving maneuver" is described in the following paragraph. The second submethod responds preferably already for a small pressure loss and is, because of the higher sensitivity, usable only during driving maneuvers having a lower dynamic. The second submethod is so designed that the announcement of the information "pressure loss" is suppressed for tight curves or intense acceleration. In contrast, the first submethod is suitable for pressure loss detection already in non-quiet (dynamic) driving maneuvers.

Under the term "dynamic driving maneuver", a maneuver is understood in the sense of the invention wherein an influence of the driving condition on the dynamic rolling circumference or the dynamic rolling radius takes place only up to a certain minimum amount. This is, in general, then the case when low acceleration forces operate on the vehicle such as transverse acceleration Q, longitudinal acceleration L or yaw rate ø.

The term "little dynamic driving maneuver" is understood in the sense of the invention when no dynamic driving maneuver as described above is present. This is preferably the case when Q is less than or equal to approximately 0.3 g, L is less than or equal to approximately 0.3 g and ø is less than or equal to approximately 7°/s. If at least one of the listed quantities lies above the above given limit values, then preferably a dynamic driving maneuver is present.

The two further submethods distinguish from each other especially in that the second submethod has a narrower limit value range than the first submethod. If the submethods include steps for inquiry or monitoring of acceleration data, then, in general, the learning phase and/or the comparison phase is interrupted when the acceleration values exceed fixed threshold values so that the two respective reference values, which are taken up in the respective method runthrough, are not considered.

The first submethod differs especially from the second submethod in addition in that, in the first submethod, a consideration of the specific reference values takes place only for low dynamic driving situations whereas a consideration of the reference values in the second submethod takes place also during dynamic driving maneuvers. This means that during low dynamic driving maneuvers, both submethods are active simultaneously and during dynamic driving maneuvers, only the second submethod is active.

Preferably, the second submethod is carried out only so long until at least an acceleration value including the longitudinal acceleration and transverse acceleration exhibits a value which is less than or equal to 0.15 g (here, g is the earth acceleration) or the yaw rate exhibits a value of less than or equal to approximately 3°/s. The suppression or the switchoff of a submethod can take place in that either the algorithm for the submethod is called up by the main program in dependence upon the driving situation or, in a submethod, a check of the driving conditions is undertaken.

In addition to the above described methods for pressure determination, a third further velocity-dependent submethod can be carried out which detects a velocity pattern of the wheel rpm trace. The velocity-dependent submethod detects the velocity pattern which is generated by a specially prepared emergency tread.

The above mentioned specially prepared emergency tread of a run-flat wheel has preferably cavities on the surface which generate a characteristic oscillation during rolling of the emergency tread on a roadway. This oscillation is detectable based on the velocity trace of the wheel and is therefore measurable by means of wheel rpm sensors.

According to the invention, a first further submethod (Prog A) having a response at high pressure loss, a second further submethod (Prog B) having a response at a lower pressure loss and a third further submethod (Prog S), carried out parallel or quasi parallel, is provided which responds when, for a vehicle tire having a specially made emergency tread, a velocity pattern is detected which is characteristic for a tire pressure loss.

By means of the method of the invention, it can be reliably detected at which time point a contact occurs between emergency, tread and tire casing (flat tire). A warning announcement, which is based on the effect of the increase of the dynamic rolling radius, is comparatively safe and reliable because it is not a relative measurement as in conventional pressure loss detection methods. It is therefore possible to generate additional signals or instructions proceeding from the occurrence of the flat tire. Accordingly, a residual running distance for the tire in the flat condition can be indicated. Preferably, residual running distances for the tires in the flat tire condition are preferably indicated in accordance with the invention. The residual running distances can be especially dependent upon the type of tire.

Preferably, the method according to the invention is carried out to measure the pressure of the vehicle tires within a method for controlling the braking force and/or the driving dynamic (ABS, ASR, ESP).

The outputs of the submethods, which contain information as to a pressure loss, are preferably OR-coupled to a common output. This output can, for example, be connected to a warning lamp in the dashboard.

The method of the invention requires only units which are anyway present in a conventionally used ABS, ASR or ESP system. For this reason, this method can be cost-effectively integrated into such a system in an advantageous manner.

The intention therefore relates also to an arrangement for controlling the braking force and/or the driving dynamic and for measuring the pressure of vehicle tires which is characterized in that a microcomputer processes an above-described method according to the invention and a method known per se for controlling the braking force and/or driving dynamic. The microcomputer is connected to wheel rpm sensors and, if needed, additional driving dynamic sensors.

BRIEF DESCRIPTION OF THE DRAWINGS

The invention will now be explained with reference to the drawings wherein.

DESCRIPTION OF THE PREFERRED EMBODIMENT OF THE INVENTION

Figure 1:
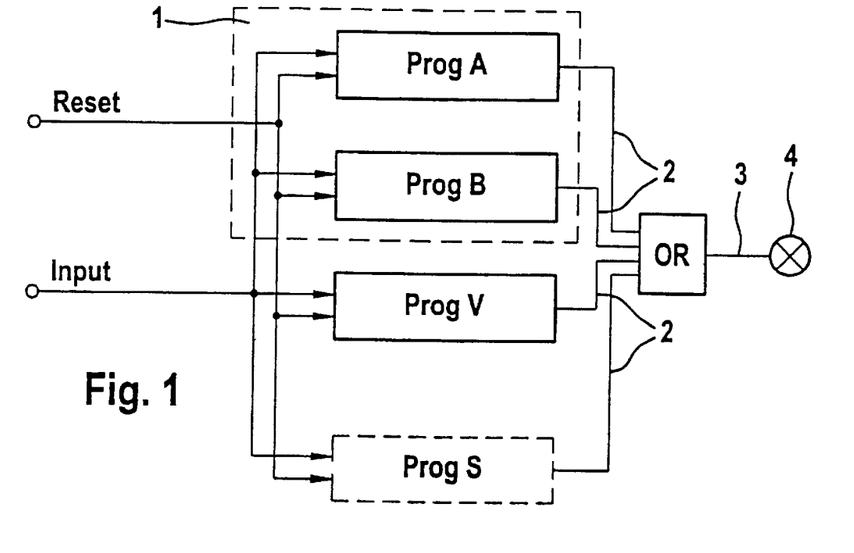
FIG. 1 shows a schematic representation of a method for pressure loss detection having several submethods.

In FIG. 1, an example is shown for a preferred method according to the invention having three or four quasi parallel configured submethods Prog A, Prog B, Prog V and/or Prog S. The present invention relates especially to the submethod "Prog V".

With a connection "reset", the submethods in FIG. 1 can be reset to their starting state. Line "input" symbolizes the connection for the signals of the four wheel rpm sensors of the motor vehicle. The submethods have outputs 2 which are combined via a coupling element OR to a common output signal 3. The coupling element OR is an OR coupling. The output signal 3 can be connected to a warning lamp 4.

The unit 1, which is shown in FIG. 1, includes the submethods "Prog A" and "Prog B". With unit 1 and according to the basic principle, the known pressure loss detection can be carried out for all tire types (standard tires, run-flat wheels). The submethods (Prog V, Prog S) are especially suitabler for special tires, such as tires having a generating device for a velocity pattern or tires having an emrgancy tread.

Submethod "Frog V" functions to detect a velocity pattern in the wheel rpm trace. Submethod "Prog S" functions to detect an increase of the dynamic wheel radius. As with the submethods "Prog A" and "Prog B", both submethods (Prog V. Prog S) define separately operational methods for detecting a pressure loss in tires of a motor vehicle. The submethods "Prog S" and "Prog V" are comparatively less sensitive with respect to dynamic driving situations.

Figure 2A:
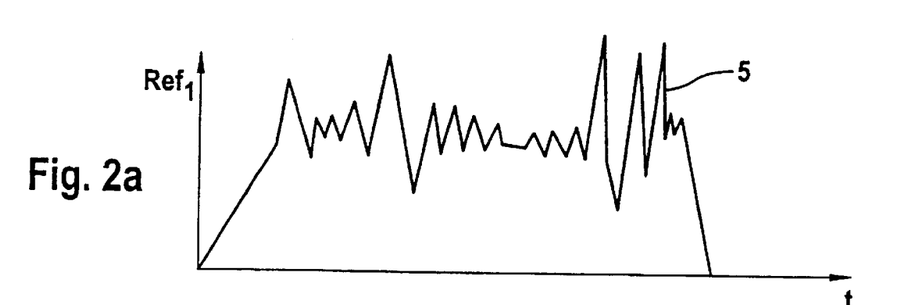
FIG. 2a shows a diagram having a time-dependent trace of a reference value formed from the wheel signals.
Figure 2B:
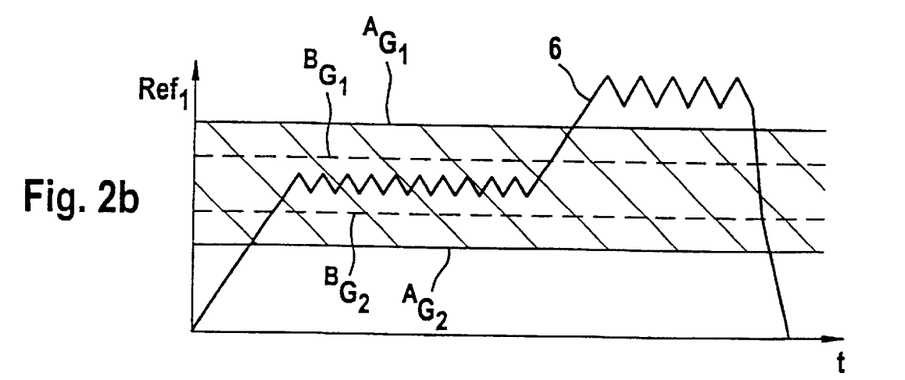
FIG. 2b shows a further diagram having a time-dependent trace of a reference value, which is formed from the wheel signals, plus limit values for the pressure determination in accordance with the method known per se.

As described in greater detail below and as shown in FIG. 2b, the submethod "Prog A" can be so configured that coarse thresholds are fixed by values $^AG_1$ and $^AG_2$ during the learning phase so that an end of the learning phase can take place comparatively fast after the reset by pressing the reset key when filling the tires to the initial rated pressure. Even when, after filling the tires, one drives exclusively so that the vehicle is for a long time in a dynamic driving state, the learning method can already be ended after a time of preferably less than approximately one minute.

Figure 3:
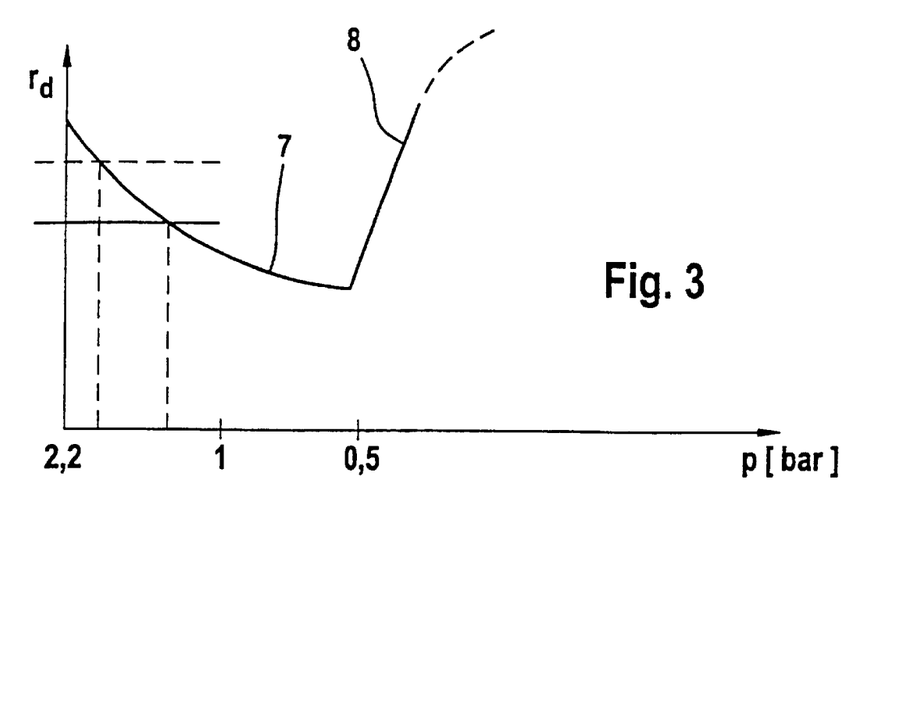
FIG. 3 is a diagram having the trace of the dynamic wheel radius $r_d$ in dependence upon the tire pressure P; and, FIG. 4 is a schematic view of a section of a run-flat wheel having an emergency tread on the rim.
Figure 4:
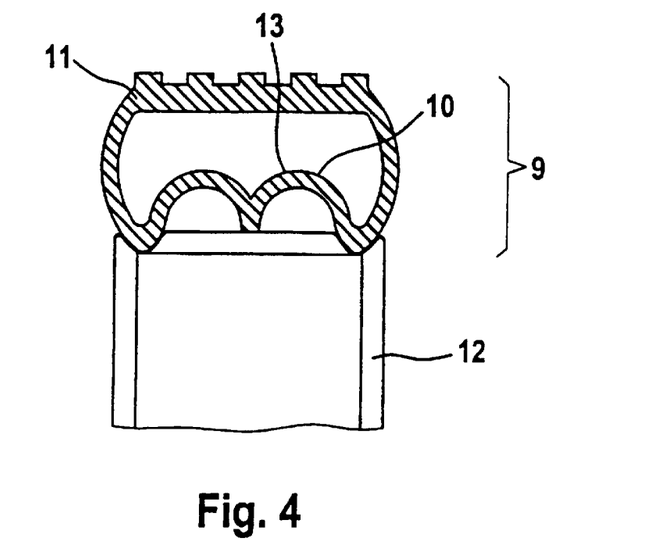
Figure 5:
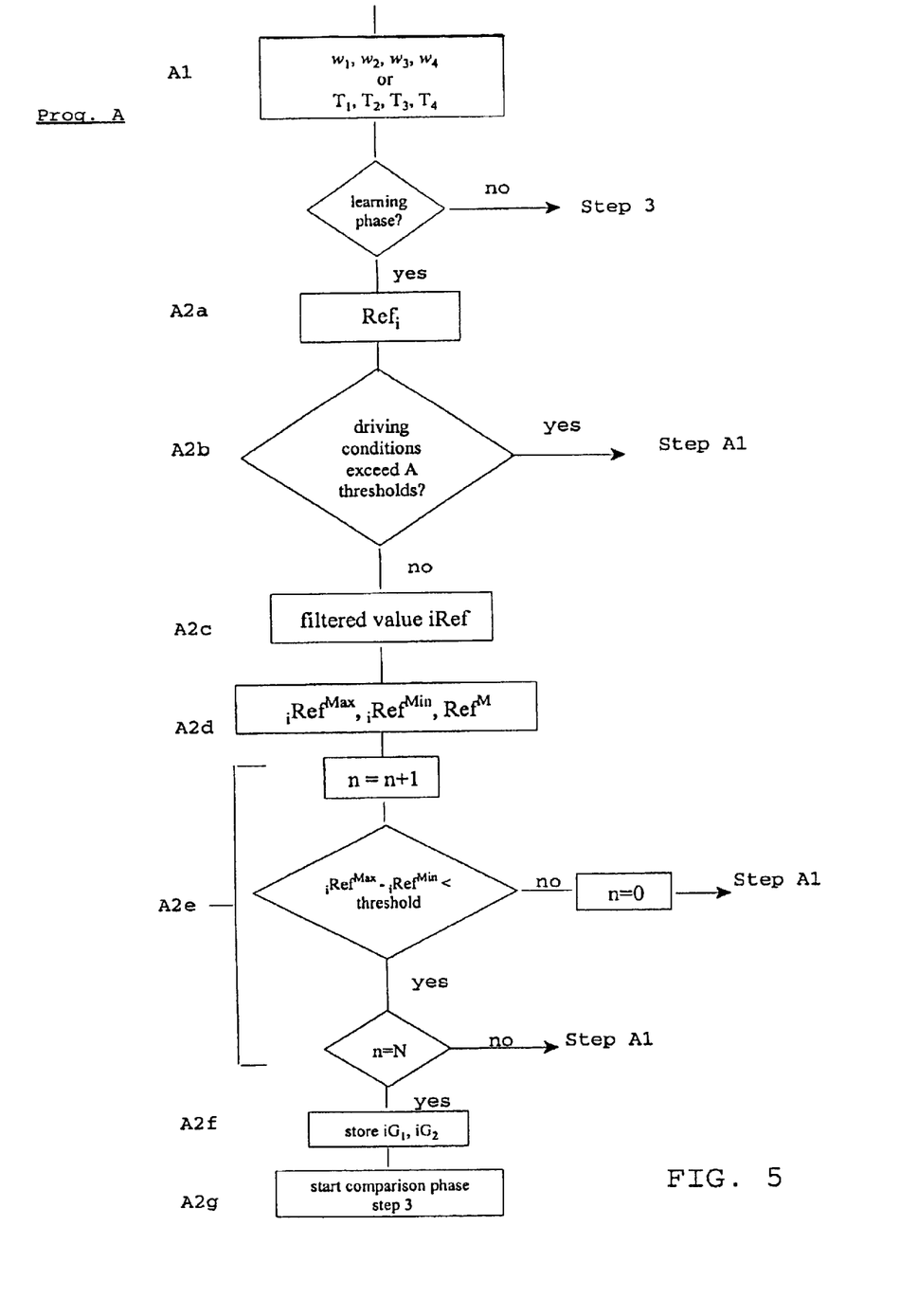
FIG. 5 is a flow diagram illustrating the steps of submethod Prog A.
Figure 6:
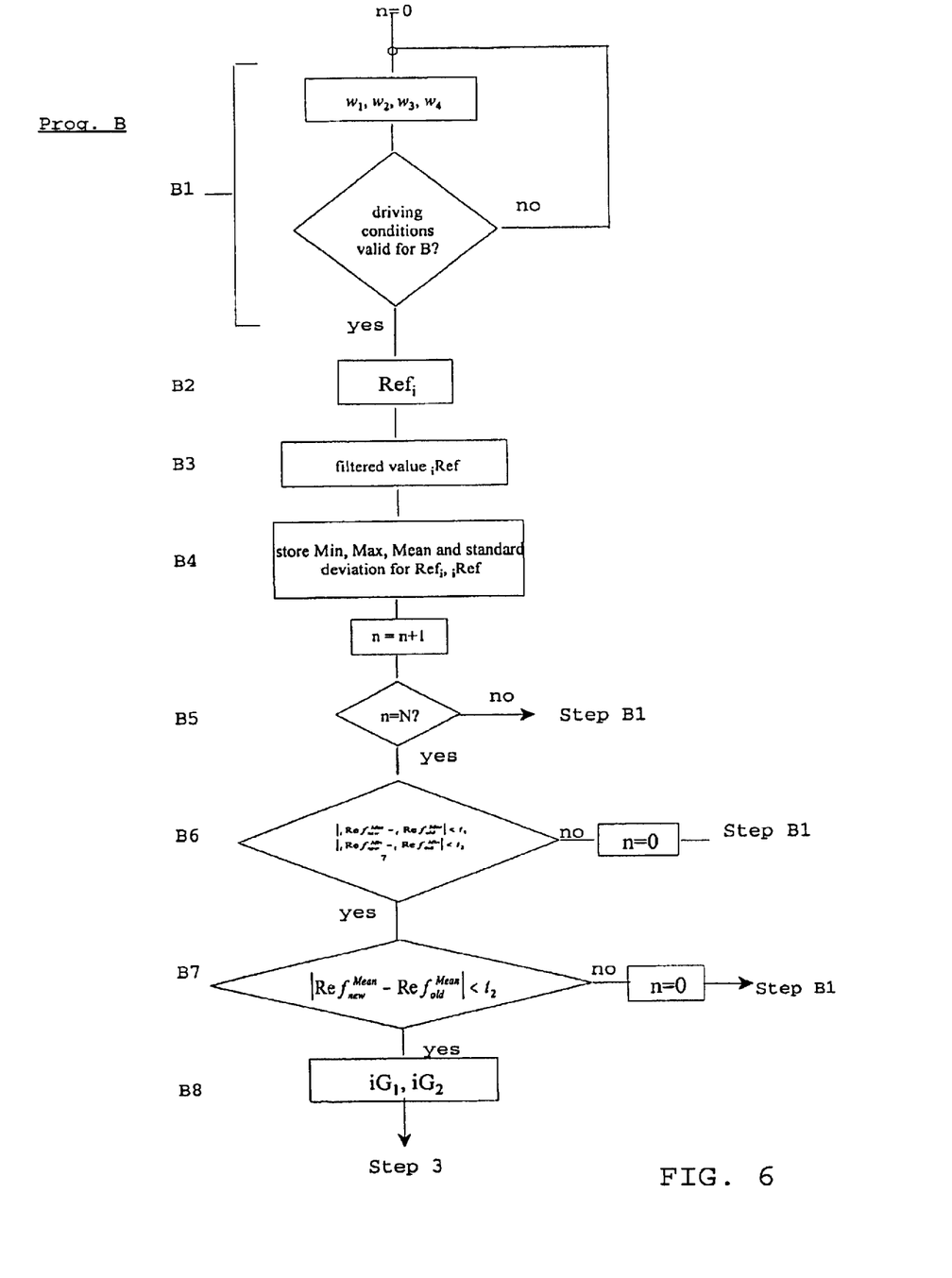
FIG. 6 is a flow diagram illustrating the steps of submethod Prog B.
Figure 7:
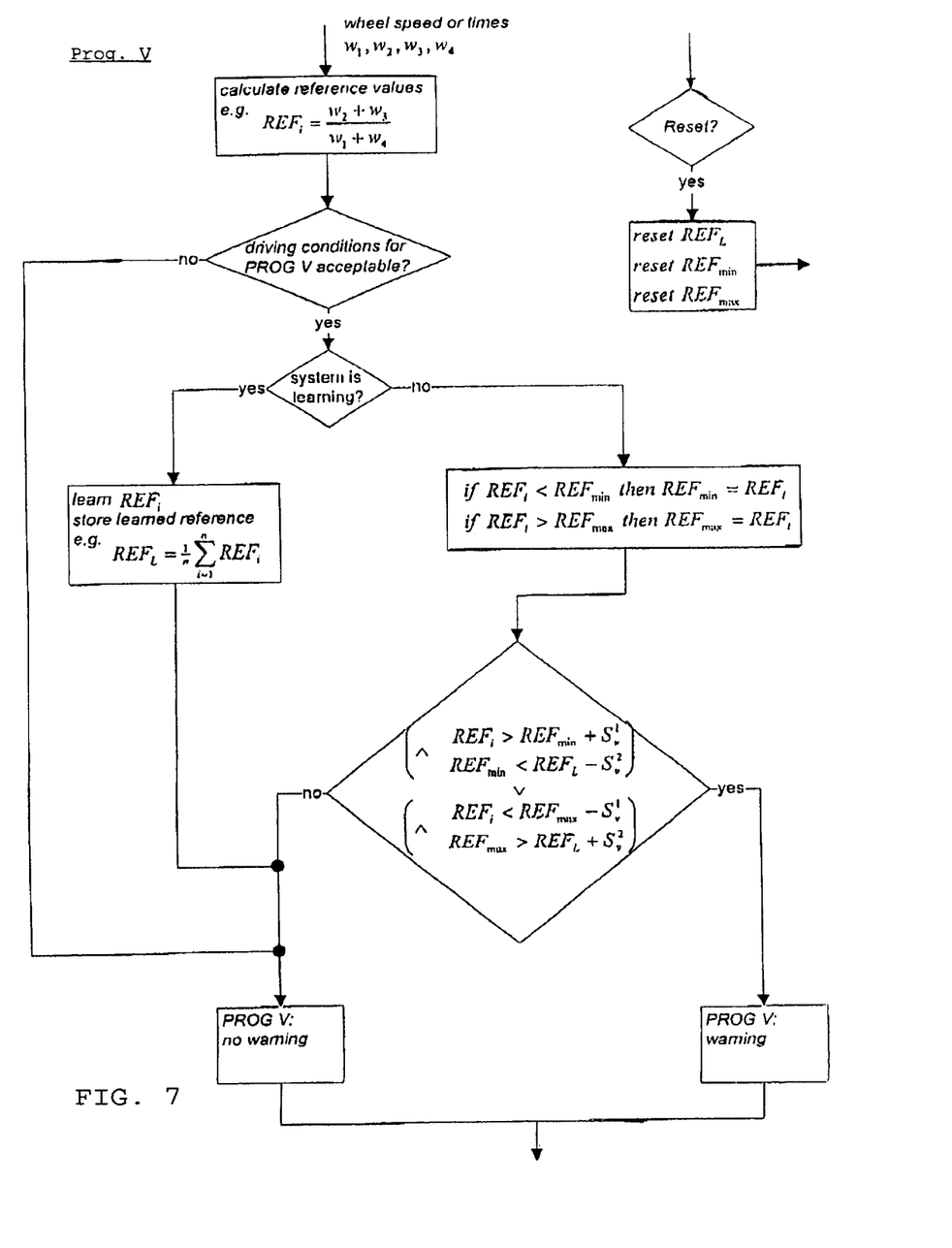
FIG. 7 is a flow diagram illustrating the steps of submethod Program V.

Description of the Method Steps of Prog V (Method According to the Invention The operation of Prog V is explained in greater detail with respect to FIGS. 3 and 4. If run-flat wheels 9 are mounted on the motor vehicle, then the dynamic rolling radius $r_d$ first drops in dependence upon tire pressure as in a conventional tire (reference numeral 7). If the pressure loss is so great that the emergency tread 10, which is provided in a run-flat wheel, touches the casing 11 of the tire, then the dynamic rolling radius increases greatly (reference numeral 8).

The method "Prog V" conducts a check as to a drop of the rotational velocity of the wheels which is a consequence of the increase of the dynamic rolling radius $r_d$.

The method for detection in method "Prog V" by means of velocity changes of the wheels, can, in specific tire types, be considerably less sensitive than in the methods "Prog A" and "Prog B" described in detail hereinafter. In this method, it is already sufficient to monitor the individual wheel velocities or reciprocal wheel velocities (time values) directly as to exceeding (dropping below) fixed pregiven limit values which are dependent upon the type of tire used. Practically, these limit values need not be learned in the system in a learning method as described hereinafter; rather, it is possible to store fixedly stored tire-type dependent limit values in a data bank.

Description of the Method Steps of Prog A (First Further Submethod)

Step A1:

Picking up the angular velocities by means of wheel sensors of the wheels $w_1$, $w_2$, $w_3$ and $w_4$; wherein: $w_1$ identifies the right forward wheel, $w_2$ the left forward wheel, $w_3$ the right rear wheel and $w_4$ the left rear wheel. Instead of a value for the angular velocity w, a time-dependent quantity T can preferably be used as an index for the wheel velocity, especially, a synchronization to a sensor flank can take place. This affords the advantage of increased accuracy in the determination of the wheel velocities.

Step A2:

Determining comparison values (learning phase) via the steps A2a to A2g.

Step A2a:

Forming reference values in accordance with the equation $$\text{Ref}_i = (w_k + w_l)/(w_m + w_n)$$

from current values of w (or, preferably a time T), with the values being determined in accordance with the method under point 1; wherein i=1 ... 3 and the $w_i$ identify different wheels with each reference value.

In FIGS. 2a and 2b, an example is shown for a trace of $\text{Ref}_1 = (w_k + w_1)/(w_m + w_n)$ in dependence upon the time t; wherein: k=forward left, l=rearward right, m=forward right and n=rearward left. The trace of curve 5 or 6 provides information as to deviations of the dynamic rolling radius for a pressure loss. If all wheels would have the same angular velocity for ideal conditions, then the value of the reference value would be $\text{Ref}_1 = 1$. For a pressure loss, the reference value deviates by a specific amount from the value 1. The trace of $\text{Ref}_1$ is, however, dependent by a significantly greater amount on the actual driving conditions such as roadway characteristics, acceleration or driving in a curve.

Step A2b:

Checking whether the driving conditions or driving situation lies in a permissible range. If a driving condition is present which does not appear to be purposeful for forming the reference values (for example, when the longitudinal acceleration, the transverse acceleration or the wheel acceleration exceed specific threshold values), then the submethod is not carried out.

Step A2c:

Generating filtered reference values $\overline{\text{Ref}_i}$, for example, by means of a lowpass filter of the first order. The lowpass filtering can be carried out either by evaluating stored data of reference values or by means of a recursion method for lowpass filtering.

Step A2d:

Storing upper and lower limits of the filtered and unfiltered reference values $_i\text{Ref}^{Max}$ and $_i\text{Ref}^{Min}$ and generating a mean value $\text{Ref}^M$ from the earlier data or recursive generation of a mean value.

Step A2e:

Repeat steps A1 to A2d until the number of determined reference values has reached a value N (N>1, preferably N>5) and check as to whether the difference of $_i\text{Ref}^{Max}$ and $_i\text{Ref}^{Min}$ does not exceed a specific threshold value. If this threshold value is exceeded, then the submethod is begun anew.

Step A2f:

Storing upper and lower limit values $_iG_1$, $_iG_2$ in dependence upon the reference values which are determined in the elapsed time span (learn phase); wherein an offset value is added to or subtracted from the mean value $\text{Ref}^M$ for forming the limit values.

Step A2q:

Continuing the execution of the program in the program part "comparison phase" which is described under point 3.

Description of the Method Steps of Prog B (Second Further Submethod)

Compared to the method described under point 2, the method steps of Prog A are modified in Prog B in a manner described hereinafter. The method described here corresponds substantially to the method presented in U.S. Pat. No. 6,439,045 for the description of FIG. 2 which is incorporated herein by reference. In this method, a current sample is compared to a sample stored at an earlier time point. The method "Prog B" has a considerably higher time requirement compared to Prog A. For this reason, the method "Prog B" can lead to a successful determination of comparison values when the method of Prog A under point 2 is not suitable to determine comparison values based on a dynamic driving situation.

Step B1:

Picking up the wheel rpm signals of the individual wheels. Here, a check can be made as to whether no driving condition is present which makes it appear not purposeful to form the reference values. When it is detected that such a driving condition is present, the current runthrough of the method is ended. Otherwise, a transition to step B2 takes place.

Step B2:

From the measured wheel rpms, at least one reference value of the reference values $\text{Ref}_1$, $\text{Ref}_2$, $\text{Ref}_3$ is formed as described above. Here too, as likewise described above, a formation of the reference values can take place either via time signals T or by utilizing wheel velocities.

Step B3:

Generating an additional set of data from the determined reference values by lowpass filtering. Here too, the lowpass filtering can be a recursive method which stores only the last filtered value at a current time point.

Step B4:

Check whether the currently determined filtered reference value is greater than the maximum value of the unfiltered reference values determined up to now and, if required, storing the new maximum value. In the same manner, the instantaneously valid minimal value is also determined. Additionally, it can be practical to also continuously determine a mean value from the unfiltered reference values as well as to determine the standard deviation corresponding thereto.

Step B5:

Checking whether a further pregiven number N of reference values was determined, that is, whether a complete sample of reference values was recorded. If this is not the case, then the current runthrough of the method is ended. Otherwise, the method is continued.

Step B6:

Checking whether the maximum value of the filtered reference values of the current recorded sample deviates by no more than a pregiven amount from the maximum value of the filtered reference value of the last stored sample. Furthermore, a check is made in this step whether the minimum value of the described reference values of the current recorded sample deviates by no more than a pregiven amount from the minimum value of the described reference values of the last stored sample. Otherwise, the method is repeated until the condition is satisfied.

Step B7:

If required, checking whether the mean value of the unfiltered reference values of the current sample deviates by no more than a specific amount from the mean value of the unfiltered reference values of the last stored sample. Furthermore, a check takes place, when practical, as to whether the mean value of the unfiltered reference values of the current sample plus as well as minus a multiple of a quality index lies within the limits which are given by the upper limit value and the lower limit value. This multiple can, for example, amount to the fourfold. Otherwise, the method is ended.

Step B8:

Determination of an upper limit value in that an offset value is added to the maximum value of the filtered reference values of the current sample. A lower limit value is determined in that an offset value is subtracted from the minimum value of the filtered reference values of the current sample.

If one of the checks yielded the result that the deviations of the values in the current sample were too large, then a transition takes place to step B6 in that the corresponding values of the current sample (mean value, standard deviation of the unfiltered reference values, maximum value and minimum value of the filtered reference values of the current sample) are stored for comparison to future recorded samples.

3) Comparison Phase

Determination of reference values in accordance with point 2a or B2 and computation in accordance with one of the formulas:

$$_iG_1 < _i\text{ref} < _iG_2 \text{ or} \qquad \text{Formula A)}$$

$$_iG_1 < _i\text{Ref}^{Filt} < _iG_2, \qquad \text{Formula B)}$$

wherein $_i\text{Ref}^{Filt}$ can be reference values filtered in a manner known per se. With the computation according to one of the formulas A or B, a check can be made in accordance with the method of the invention as to whether a pressure loss has occurred. If a pressure loss is present, then information as to the pressure loss of the wheel is outputted. If several reference values are formed, that wheel can be individually identified which exhibits the pressure loss from a consideration of the reference values in a practical manner.

Description of the Method Steps of Prog S (Third Further Submethod)

The method "Prog S" functions to detect a velocity pattern of a special-wheel/tire suitable for generating a velocity pattern. A method usable in accordance with the invention is described in U.S. Pat. No. 6,591,668 mentioned initially herein and incorporated herein by reference. The wheel can be equipped with an emergency tread which is modified for generating the velocity pattern.

Also with this method, the wheel rpm signals of the wheels are detected by the ABS system and are transmitted to the central computer unit. The periodic oscillation, which is proportional to the wheel rpm and characteristic for the emergency state, is generated by an emergency body 10 supported on the rim 12. On its emergency tread 13, the emergency body has a plurality of indentations which are uniformly or non-uniformly distributed over the periphery.

According to the method, the wheel velocities are first recorded within defined count times. With the aid of the indentations, periodic oscillations of the n-th order of the tire period (for example, n=13) are generated. These oscillations are proportional to the wheel rpm and are characteristically defined separately. If these oscillations are referred to the mean value of the wheel rpm, then zero crossover times of the rpm output signal can be given. For a conventional tire, the distances of the zero crossover times are essentially constant; whereas, for the special tire used here, significant noticeable periodic deviations of approximately 0.02 milliseconds result.

According to the method given in this example, the set of data from the zero crossover times in dependence upon the time is analyzed via numerical Fourier transformation (FFT). In this way, a spectral power density is obtained plotted as a function of the frequency.

Peaks can be reliably determined based on the data curve having the spectral power density as a function of the frequency with the data curve being obtained in accordance with the transformation. These peaks are caused by the velocity variation of the special tire. To evaluate these signals, specific pregiven frequency ranges of the transformed signals are then integrated. Thereafter, the determined integral values are compared to reference values and/or threshold values and, when a pregiven difference to the reference and/or threshold values is exceeded, a warning signal is outputted to a warning device mounted in the field of view of the driver.

The threshold value, which is used with the method "Prog V" must be selected so large that an increase of the wheel velocities can be reliably excluded, for example, via sun radiation on a tire. Suitable values are determined by the technician from driving experiments. The values are dependent in a sensitive manner from the tire and vehicle type.

What is claimed is:

1. A method for detecting a pressure loss in a tire in a motor vehicle during travel including detecting a seating of the tire casing on an emergency tread in the tire or a drop of the tire pressure below a threshold value, the method comprising the steps of:

detecting the respective angular velocities of the wheels of said motor vehicle utilizing sensors assigned to corresponding ones of said wheels;

detecting a loss of pressure in the tire of at least one of said wheels from an increase in the angular velocity of said one wheel relative to the angular velocities of said other wheels; and, after said loss of pressure, detecting a sudden decrease in the ancular velocity of said one wheel indicating a massive loss of air pressure.

2. The method of claim 1, wherein an increase in the dynamic rolling radius ($r_d$) is associated with said sudden decrease in the angular velocity of said one wheel; and, a pressure loss is detected: when the current value of the angular velocity or of the dynamic rolling radius has increased relative to an initial value of the considered wheel or a fixed pregiven threshold value, the initial value being stored at an earlier time point; or, wherein a check is made as to whether the dynamic rolling radius ($r_d$) increases after this rolling radius has dropped off previously as a consequence of said massive loss of air pressure.

3. The method of claim 1, wherein the motor vehicle wheels are run-flat wheels having an emergency tread mounted on the rim or within the tire casing.

4. The method of claim 1, wherein an increase in the dynamic rolling radius ($r_d$) is associated with said sudden decrease in the angular velocity of said one wheel; and, the pressure determining method includes additionally further submethods which detect pressure losses of lesser amount based on a drop of the angular velocity or of the dynamic rolling radius ($r_d$); and, the steps of the submethods are carried out in parallel or quasi parallel.

5. The method of claim 1, wherein the pressure loss detecting method includes a first further submethod (Prog A) and a second further submethod (Prog B); both further submethods generate one or more reference quantities $Ref_i$ from the angular velocities or informations which indicate the angular velocities on the basis of time intervals; and, thereupon a check is made of the reference quantity or quantities as to whether upper and lower limit values $G_1$ and $G_2$ are exceeded; and, the second further submethod (Prog B) has limit values $^BG_1$ and $^BG_2$ which define a narrower range than the limit values $^AG_1$ and $^AG_2$ of the first further submethod (Prog A) so that $^BG_1 < {}^AG_1$ and $^BG_2 > {}^AG_2$.

6. The method of claim 5, wherein at least one of the submethods is a third further submethod (Prog S) which detects a velocity pattern of the wheel rpm trace which is generated by a vehicle tire having a specially provided emergency tread.

7. The method of claim 6, wherein the specially provided emergency tread has cavities on the surface which, during rolling of the emergency tread on a roadway, generate an oscillation which is characteristic for the emergency state and is detectable by means of wheel rpm sensors.

8. The method of claim 5, wherein the following are provided: a first submethod (Prog A) having a response at a high pressure loss, a second submethod (Prog B) having a response at a lower pressure loss and a third parallel or quasi parallel executed submethod (Prog S) which responds when a velocity pattern is detected for a vehicle tire having a specially provided emergency tread and which velocity pattern is characteristic for a tire pressure loss.

9. The method of claim 1, wherein the method for measuring the pressure of vehicle tires is carried out within a method for the control of the braking force and/or of the driving dynamic (ABS, ASR, ESP).

10. The method of claim 5, wherein a reference quantity $Ref_i$ is formed in that the sums of each two signals, which represent the wheel rpms, are divided.

11. The method of claim 5, wherein the outputs of the submethods are OR coupled to a common output with the outputs containing information as to a pressure loss.

12. An arrangement for controlling the braking force and/or the driving dynamic and for measuring the pressure of tires in a motor vehicle, the arrangement comprising:

sensors for detecting the respective angular velocities of the wheels of said motor vehicle;

a microcomputer connected to said sensors;

said microcomputer functioning to carry out a method including the steps of:

detecting the respective angular velocities of the wheels of said motor vehicle utilizing sensors assigned to corresponding ones of said wheels;

detecting a loss of pressure in the tire of at least one of said wheels from an increase in the angular velocity of said one wheel relative to the angular velocities of said other wheels; and after said loss of pressure, detecting a sudden decrease in the angular velocity of said one wheel indicating a massive loss of air pressure; and, said microcomputer further functioning to carry out a method for controlling the braking force and/or driving dynamic.

13. A method for detecting a pressure loss in a tire in a motor vehicle during travel including detecting a seating of the tire casing on an emergency tread in the tire or a drop of the tire pressure below a threshold value, the method comprising the steps of:

providing sensors for detecting the respective angular velocities of the wheels of said motor vehicle; and, detecting the loss of pressure in at least one of said tires by detecting a high pressure loss or a total pressure loss in said tire based at least on one of the following:

a reduction of the angular velocity of one or more wheels and/or an increase of the dynamic rolling radius $r_d$ of one or more of said wheels; and, wherein the pressure loss detecting method includes a first further submethod (Prog A) and a second further submethod (Prog B); both further submethods generate one or more reference quantities $Ref_i$ from the angular velocities or informations which indicate the angular velocities on the basis of time intervals; and, thereupon a check is made of the reference quantity or quantities as to whether upper and lower limit values $G_1$ and $G_2$ are exceeded; and, the second further submethod (Prog B) has limit values $^BG_1$ and $^BG_2$ which define a narrower range than the limit values $^AG_1$ and $^AG_2$ of the first further submethod (Prog A) so that $^BG_1 < {}^AG_1$ and $^BG_2 > {}^AG_2$.

14. The method of claim 13, wherein at least one of the submethods is a third further submethod (Prog S) which detects a velocity pattern of the wheel rpm trace which is generated by a vehicle tire having a specially provided emergency tread.

15. The method of claim 14, wherein the specially provided emergency tread has cavities on the surface which, during rolling of the emergency tread on a roadway, generate an oscillation which is characteristic for the emergency state and is detectable by means of wheel rpm sensors.

16. The method of claim 13, wherein the following are provided: a first submethod (Prog A) having a response at a high pressure loss, a second submethod (Prog B) having a response at a lower pressure loss and a third parallel or quasi parallel executed submethod (Prog S) which responds when a velocity pattern is detected for a vehicle tire having a specially provided emergency tread and which velocity pattern is characteristic for a tire pressure loss.

17. The method of claim 13, wherein a reference quantity $Ref_i$ is formed in that the sums of each two signals, which represent the wheel rpms, are divided.

18. The method of claim 13, wherein the outputs of the submethods are OR coupled to a common output with the outputs containing information as to a pressure loss.

* * * * *

UNITED STATES PATENT AND TRADEMARK OFFICE
CERTIFICATE OF CORRECTION

PATENT NO.    : 6,822,561 B2
DATED         : November 23, 2004
INVENTOR(S)   : Michael Latarnik deceased, et al.

It is certified that error appears in the above-identified patent and that said Letters Patent is hereby corrected as shown below:

Column 2,
Line 3, delete "CABS)" and substitute -- (ABS) -- therefor.

Column 5,
Line 21, delete "emergency," and substitute -- emergency -- therefor.

Column 6,
Line 11, delete "EMBODIMENT" and substitute -- EMBODIMENTS -- therefor.
Line 33, delete "FROG V" and substitute -- PROG V -- therefor.
Line 37, delete "V. PROG S)" and substitute -- V, PROG S) -- therefor.
Line 53, delete "Invention" and substitute -- Invention) -- therefor.

Column 8,
Line 6, delete "$_1G_1$" and substitute -- $_iG_1$ -- therefor.
Line 11, delete "A2q:" and substitute -- A2g: -- therefor.

Column 9,
Line 6, delete "$_i$ref" and substitute -- $_i$Ref -- therefor.
Line 11, -- at -- should be insterted before "least".

Signed and Sealed this

First Day of February, 2005

JON W. DUDAS
*Director of the United States Patent and Trademark Office*